United States Patent
Bergman et al.

(10) Patent No.: US 10,525,895 B2
(45) Date of Patent: Jan. 7, 2020

(54) LOAD CARRIER

(71) Applicant: Thule Sweden AB, Hillerstorp (SE)

(72) Inventors: Fredrik Bergman, Vaggeryd (SE); Magnus Ferman, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 16/150,969

(22) Filed: Oct. 3, 2018

(65) Prior Publication Data
US 2019/0111853 A1    Apr. 18, 2019

(30) Foreign Application Priority Data
Oct. 16, 2017 (EP) ...................................... 17196621

(51) Int. Cl.
| | | |
|---|---|---|
| B60R 9/048 | (2006.01) | |
| B60R 9/052 | (2006.01) | |
| B60R 9/05 | (2006.01) | |

(52) U.S. Cl.
CPC ................ *B60R 9/048* (2013.01); *B60R 9/05* (2013.01); *B60R 9/052* (2013.01)

(58) Field of Classification Search
CPC .. B60R 9/04; B60R 9/05; B60R 9/052; B60R 9/058; B60R 9/045
USPC ....................................................... 224/316
See application file for complete search history.

(56) References Cited

U.S. PATENT DOCUMENTS

| | | | | |
|---|---|---|---|---|
| 5,178,919 A | * | 1/1993 | Mimura | .................. B60R 13/04 296/93 |
| 8,925,775 B2 | * | 1/2015 | Sautter | .................... B60R 9/058 224/322 |
| 9,102,274 B2 | * | 8/2015 | Hubbard | .................. B60R 9/04 |

FOREIGN PATENT DOCUMENTS

| | | |
|---|---|---|
| DE | 102010049983 A1 | 4/2012 |
| WO | WO 2009/038479 A1 | 3/2009 |
| WO | WO 2014/184172 A2 | 11/2014 |

OTHER PUBLICATIONS

European Examination Report for European Application No. 17196621. 1, dated Dec. 13, 2017 (2 pages).

* cited by examiner

*Primary Examiner* — Adam J Waggenspack
(74) *Attorney, Agent, or Firm* — Sterne, Kessler, Goldstein & Fox P.L.L.C.

(57) ABSTRACT

A load carrying bar for a roof rack including a channel with an opening for receiving a fastening member of a load carrying bar accessory, and a cover including a channel sealing portion adapted to substantially seal a cross section of the opening of said channel of said load carrying bar in a cross section. A biasing portion is configured in a first position to bias said channel sealing portion towards said opening and configured in a second position to deflect said channel sealing portion away from the opening. The biasing portion includes at least one biasing member. A first end of the biasing member is connected to the channel sealing portion. A second end of the biasing member is configured to engage a base part of the channel. A central portion of the biasing member is positioned between the first end and the second end.

17 Claims, 2 Drawing Sheets

LOAD CARRIER

CROSS REFERENCE TO RELATED APPLICATION

This application claims priority to EP Application No. 17196621.1, filed Oct. 16, 2017, the disclosure of which is hereby incorporated by reference in its entirety.

FIELD OF THE INVENTION

A load carrying bar for a roof rack, said load carrying bar comprising a channel with an opening for receiving a fastening member of a load carrying bar accessory, a cover comprising a channel sealing portion adapted to substantially seal a cross section of the opening of said channel of said load carrying bar in a cross section, and a biasing portion configured in a first position to bias said channel sealing portion towards said opening and configured in a second position to deflect said channel sealing portion away from the opening, where the biasing portion comprises at least one biasing member, where a first end of the biasing member is connected to the channel sealing portion, a second end of the biasing member is configured to engage a base part of the channel, and a central portion that is positioned between the first end and the second end.

BACKGROUND

Roof racks comprising load carrying bars mounted to the roof of an automobile via load carrier feet are commonly used to provide for an improved load capacity on automobiles. During recent years, a trend has been that the cross section of the load carrying bars has been improved to reduce wind resistance and noise. One type of improved load carrying bars has a wing like cross section having a low wind resistance and low noise level.

To attach load carrying bar accessories, such as roof box, to a load carrying bar having a wing like cross section, the load carrying bar is generally equipped with a channel. The channel extends along the length of the load carrying bar and permits a fastening member to be slid along the channel and into position. The fastening member can be a screw for example. Such channels are however associated with numerous problems such as wind turbulence increasing the wind noise and wind resistance. They can also collect dirt or rubble, which in turn accidentally could damage the lacquer of the automobile.

One solution for a similar issue is disclosed in WO 2014/184172, where there is shown a cover which uses the principle of sealing an opening of a channel of a load carrying bar by biasing a portion of a cover towards the side edges of the opening of the channel of the load carrying bar from the inside of the channel. The cover comprises a biasing portion and a channel sealing portion, where the biasing portion of the cover may be formed by at least two flanges.

The existing covers provided for T-slots in crossbars have the drawback that the biasing ability of the covers may be reduced during use, which means that the cover's ability to return to its closed position may be reduced.

Thus, it is preferred to provide a cover that has is easy to use, as well as easy to produce, while presenting high quality biasing ability during use.

GENERAL DESCRIPTION

In accordance with the invention, there is provided a load carrying bar for a roof rack, said load carrying bar comprising a channel with an opening for receiving a fastening member of a load carrying bar accessory, a cover comprising a channel sealing portion adapted to substantially seal a cross section of the opening of said channel of said load carrying bar in a cross section, and at least one biasing portion configured in a first position to bias said channel sealing portion towards said opening and configured in a second position to deflect said channel sealing portion away from the opening, where the biasing portion comprises at least one biasing member, where a first end of the biasing member is connected to the channel sealing portion, a second end of the biasing member is configured to engage a base part of the channel, and a central portion that is positioned between the first end and the second end, where the central portion of the biasing member has an length between the first and the second end and a width that is substantially transversal to the length of the biasing member, wherein the at least one biasing member has a first width in the vicinity of its first and/or the second end and a second width at its central portion where the first width is greater than the second width, ensuring that the at least one biasing member will flex in the central portion when transitioned from the first position towards the second position, and/or that the at least one biasing member has a first area of weakness positioned on a medial side of the at least one biasing member and a second area of weakness positioned on a lateral side of the biasing member allowing the biasing member to flex in the first and second area of weakness when transitioned from the first position towards the second position.

The provision of a biasing member having a weakness and/or a narrower section may improve the biasing effect of the biasing member. Thus, the biasing member will always bend in a predefined area, so that the channel sealing portion may be maneuvered away from the opening in the channel, allowing access to the channel for fastening of accessories to the load carrying bar. The predefined area, where the weakness may be positioned or where the thickness is smaller, will ensure that the biasing member will buckle in the predefined area, and thereby shortening linear the distance from the first end to the second end of the biasing member, and thereby allowing the channel sealing portion to move out from the opening.

The biasing member may be seen as a member that has a resilience, and/or material memory, so that it will always seek to return to its original shape, even though it has been biased into a flexed position. This means that when there is no external force applied to the cover, possibly via the channel sealing portion, the cover will return to its natural shape, and thereby maintain its position where the channel sealing portion covers the opening from the inside of the channel. The provision of a weakness and/or a narrower portion means that if a force is applied to the channel sealing portion from a direction from the outside of the channel, it is ensured that the area having the weakness or the narrower portion is configured to flex, while the remaining parts of the biasing member (the first end part and the second end part) maintain their original shape, and only the area having the weakness or the narrowing is affected by the force. The flexing of the biasing member means that the straight line distance between the first and the second end of the biasing member is decreased when the biasing member is transitioned from its first position to its second position.

By providing a weakness on the medial side and the lateral side of the biasing member, the weakness areas may be on opposing sides of the biasing member, where the weaknesses may be configured in such a manner that each weakness facilitates the flexing of the biasing member in a certain direction, so that the biasing member may flex in different directions based on the positioning of the weakness. This may even further make it easier to manoeuvre the biasing member into a collapsed position (second position), from its extended position (first position) allowing it to make way for the channel sealing portion inside the channel.

In one embodiment, the cover may comprise a second biasing member where a first end of the biasing member is connected to the channel sealing portion, a second end of the biasing member is configured to engage a base part of the channel, and a central portion that is positioned between the first end and the second end, and configured correspondingly to the first biasing member. The provision of a second biasing member allows the biasing members to be attached in two positions on the channel sealing portion, where each biasing member is in contact with an inner surface of the channel. This may distribute the resilient force of the biasing member, i.e. the force which attempts to press the channel sealing portion into the opening of the channel, from more than one position, which may ensure that there is less risk that the channel sealing portion becomes dislodged inside the opening when the cover is in its first position, and that the resilient force may be uniformly applied to the channel sealing portion and thereby assisting it in maintaining it in parallel to the opening when in use.

In one embodiment, the cover may be U-shaped or V-shaped. The shape of the cover may be seen as a U shape or a V-shape, where the "bottom" of the U or the V extends into the opening of the channel, and the free ends act as support on the inside of the channel. I.e. the U- or the V-shape may be seen as being upside down, when the opening in the channel is in a vertical upwards direction, where the bottom of U or the V points upwards into the opening from the inside of the channel. The U- or the V-shape may be seen as a simple description of the cross sectional shape of the cover, where the shape does not have to be identical to a U or a V. It may very well be envisioned that the bottom of the shape may be the channel sealing portion, while the free ends may be seen as the biasing members. The channel sealing portion may be planar or flat (seen in cross section), while the biasing members may be straight or slightly bent when the cover is in its first position.

In one embodiment, the first ends of the first and second biasing members may be connected on opposing sides of the sealing portion. By connecting the biasing member to the opposing sides of the sealing portion, the resilient force of the biasing members, may be applied evenly on both sides of the channel sealing portion, ensuring that the channel sealing portion seeks to return to its original position from at least two sides. This means that each biasing member does not have to provide a torque to the channel sealing portion to return it into its position, as the opposing biasing member will assist in the application of the force. By providing biasing members that have force vectors that are on opposing sides of a vertical axis of the cover, and may be mirrored across the vertical axis, the resulting force will be substantially vertical, ensuring that a vertical force that is used to depress the cover into the channel will be distributed evenly to both biasing members, and the release of the vertical force will ensure that the biasing member return the force in a vertical direction, ensuring that the channel sealing portion returns to its original position inside the opening of the channel.

In one embodiment, the distance between the first ends of the first and second biasing members may be shorter than the distance between the second ends of the first and second biasing members. This means that the biasing members may be seen as diverge in a distance away from the channel sealing portion. Thus, the biasing members may be seen being spread, where the increase in distance adds to the stability of the cover, when used. Furthermore, by having the ends of the biasing members at different distances from each other, the resilient force of the biasing members may be seen as having and upwards and inwards direction for both biasing members, especially when the ends are equidistant from a vertical axis, so that the resulting force may be parallel to the vertical axis, when cover is maneuvered from its second position to its first position. Furthermore the increased distance lowers the centre of gravity, which means that the cover may have a reduced tendency to tilt from its position when an external force is applied to it.

In one embodiment, the cover in its second position may have a substantial M-shape, optionally where the channel sealing portion may be pushed vertically away from the opening, and/or where the first and the second biasing member may create a V-shape that may be mirrored across a horizontal axis. The flexing of the biasing member may occur identically on both sides of the channel sealing portion, where the second end of the biasing member remains substantially in position, while the central portion or the weakened portion flexes so that the first end moves in a direction that is inwards and downwards towards the bottom of the channel, so that the flexing point or the area where the biasing member bends as the highest point of the biasing member. The channel sealing portion is moved downwards towards the bottom of the channel, where it may pass the height of the flexing area of the biasing member, and thereby creating a substantial M shape, having the channel sealing portion as the central portion of the M shape.

In one embodiment, the width of the sealing portion may be smaller than the width of the opening of the channel. By providing a channel sealing portion that is smaller than the width of the opening of the channel, there is higher likelihood that the channel sealing portion will return to its original position inside the opening when returned from its second position. If the width is equal, there may be other factors such as rain, snow, dirt, debris, that might prevent it from returning into the opening, where the reduced width reduces this risk.

In one embodiment, a contact surface of the second end of the at least one biasing member may be rounded. By rounding the second end of the at least one biasing member, it is possible to provide a second end that is in contact with one or more of the inner walls of the channel, either a bottom wall, side wall or both, and where the rounded second end allows the biasing member to pivot, or change in angle relative to the channel sealing portion or the other parts of the cover. Thus, when force is applied to the biasing member, in order to flex and/or bend the biasing member, the biasing member may pivot in an outwards direction to give room for the channel sealing portion and the first end of the biasing member.

In one embodiment, the first end of the biasing member may comprise a contact surface to abut an inner wall of the channel, where the inner wall of the channel may be optionally a substantially horizontal wall, where the inner wall of the channel may be optionally an upper wall of the channel, where the inner wall of the channel may be optionally positioned in an area between the opening and a side wall of the channel. This contact surface may be provided so that there is provided a sealing on an inner surface of the channel, optionally the upper roof or lip of the T-shaped channel, in order to prevent dirt, water, snow or other contaminants to enter the channel. Traditionally, such a sealing is positioned in the opening, but such a sealing is very susceptible to not being effective due to damage in the material of the cover, debris and dirt, so that the seal may not be effective. By providing the sealing on the inner side of the channel, there is less risk that the seal becomes dirty, and even lower risk that the seal may be damaged due to application of force onto the cover, as the seal is not easily accessible via the opening.

In one embodiment, the at least one biasing member may have an first portion having a first central axis and a second portion having a second central axis where the first and the second central axis may be at an angle to each other. This may mean that the biasing member may be divided into two separate portions, which may be connected via a flexing portion, where the first and the second portions may be positioned at a predefined angle relative to each other when the cover is in its first position, and at different angle when the cover is in its second position. The two axes may intersect each other in both the first and the second position, so that when a force is applied to the cover, to manoeuvre it to towards its second position the angle may be increased. The angle may be seen in a cross sectional view of the biasing member. This may also mean that the first and the second axis are not coaxial, i.e. are not parallel to each other either in the cover's first position and/or in the cover's second position.

In one embodiment, the central portion and/or the area of weakness may extend along the length of the cover in parallel to the length of the load carrying bar and/or the length of the channel. Within the meaning of the present invention, the length of the cover may mean the distance that extends along the longitudinal axis of the load carrying bar, e.g. across the width of a vehicle, i.e. from one side to the other side of the vehicle. Thus the length of the cover may be seen as the length extending inside the channel along the longitudinal axis of the channel and/or the load carrying bar.

In one embodiment, the central portion and/or the area of weakness may be configured to reduce the angle (have a sharper angle) between the parts of the cover that abut the central portion and/or the weakness, when transitioning from the first position to the second position. This means that the parts of the biasing members may be adapted to flex in such a way that they move in a direction towards each other when the transitioning between the first position and the second position is occurring, and they may move away from each other when the transitioning between the second position towards the first position is occurring. The connecting part, which is the part having a reduced thickness or a weakness may be seen as the measuring point when measuring the angle between the abutting parts.

In one embodiment, the central portion and/or the area of weakness may be configured to facilitate compression and/or flexing and/or folding and/or bending creating natural hinges in the material, ensuring that the biasing member hinges in the predefined area in the central portion and/or the area of weakness.

In one embodiment, the weakness and/or the central portion may comprise a fold line that extends the length of the cover. This means that the fold line extends along the longitudinal axis of the cover and/or the longitudinal axis of the load carrying bar, where this axis may be seen as being at a right angle to the a vertical cross sectional plane of the cover.

The invention also may relate to a load carrying bar for a roof rack, said load carrying bar comprising a channel with an opening for receiving a fastening member of a load carrying bar accessory, a cover comprising: a channel sealing portion adapted to substantially seal a cross section of the opening of said channel of said load carrying bar in a cross section, and a biasing portion configured in a first position to bias said channel sealing portion towards said opening and configured in a second position to deflect said channel sealing portion away from the opening, where the biasing portion comprises at least one biasing member, where a first end of the biasing member is connected to the channel sealing portion, a second end of the biasing member is configured to engage a base part of the channel, and a central portion that is positioned between the first end and the second end, wherein the width of the biasing member in the vicinity of its first and/or the second end is larger than the width of the biasing member in its central portion, ensuring that the biasing member will flex in the central portion when transitioned from the first position towards the second position The invention also may relate to a load carrying bar for a roof rack, said load carrying bar comprising a channel with an opening for receiving a fastening member of a load carrying bar accessory, a cover comprising: a channel sealing portion adapted to substantially seal a cross section of the opening of said channel of said load carrying bar in a cross section; and a biasing portion configured in a first position to bias said channel sealing portion towards said opening and configured in a second position to deflect said channel sealing portion away from the opening, where the biasing portion comprises at least one biasing member, where a first end of the biasing member is connected to the channel sealing portion, a second end of the biasing member is configured to engage a base part of the channel, and a central portion that is positioned between the first end and the second end, wherein the biasing member has a first area of weakness positioned on a medial side of the biasing member and a second area of weakness positioned on a lateral side of the biasing member allowing the biasing member to flex in the first and second area of weakness when transitioned from the first position towards the second position.

In one embodiment, the width of the biasing member from its first portion and/or its second portion may gradually transition and/or decrease in a distance towards a central portion of the biasing member.

Within the meaning of the present invention, the meaning of the term "width" in relation to the biasing member may mean the width seen in a cross section, where the width may extend in an axis that is transversal to a longitudinal axis of the biasing member (extending along the length of the biasing member), where the length of the biasing member may mean the distance along a longitudinal axis and/or a central axis of the biasing member as seen in a cross sectional view. The height of the cover may mean the distance from the base of the cover and towards its top portion in a vertical direction, when the base faces downwards and the top portion (channel sealing portion) faces upwards.

It is to be understood based on the disclosure of the present invention that the terms upper and lower are defined in accordance with a normal use of the cover, where the channel sealing portion faces upwards while the at least one biasing member faces downwards.

DETAILED DESCRIPTION

Figure 1:
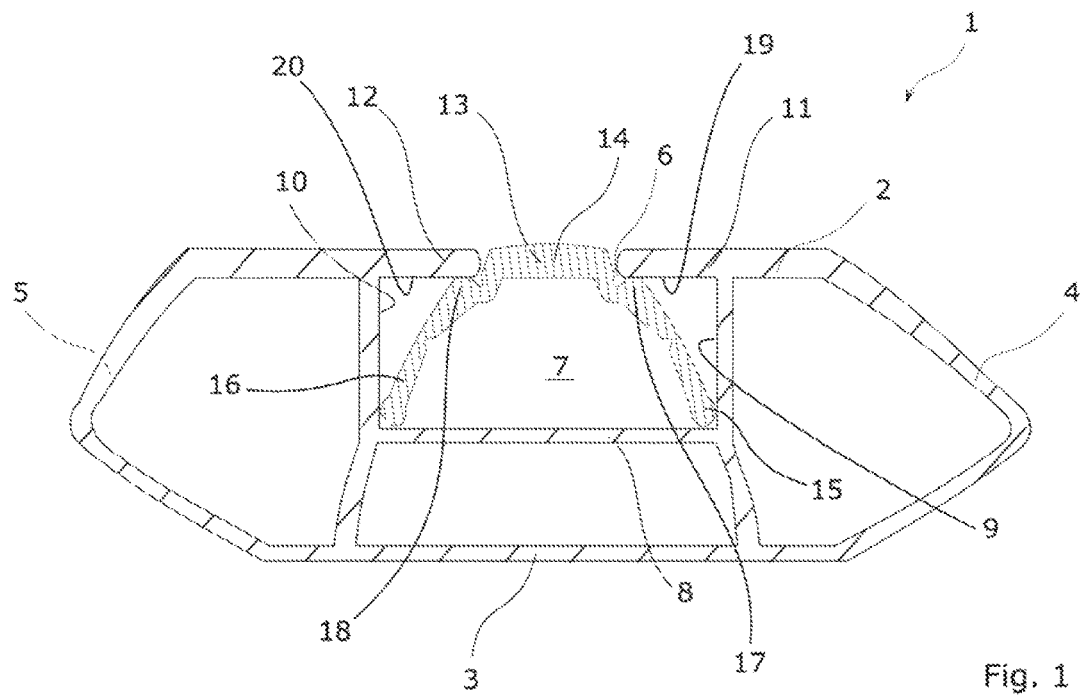
FIG. 1 shows a cross sectional diagram of a load carrying bar having a cover in a first position, according to an embodiment.

FIG. 1 shows a load carrying bar 1 of a roof rack (not shown) in cross sectional diagram, where the load carrying bar 1 comprises an upper portion 2 and a lower portion 3, which are connected by a front end 4 and a back end 5. The load carrying bar as shown in this embodiment is an example, and the specific form and shape of the bar is non-limiting in accordance with the invention, and different types of load carrying bars could be used in accordance with the present invention.

The upper portion 2 comprises an opening 6, which provides access into the load carrying bar 1, and especially into a channel 7, which extends along the length of the load carrying bar, in a direction that may be seen as perpendicular to the sectional view shown in FIG. 1. The channel 7 and the opening 6 are often described as a T-shaped channel, as the channel 7 is smaller in width than the opening 6. Thus a fastening member that is inserted into the channel, but has a larger width than the head can be secured inside the channel 7. The channel 7 has a base part 8 which may be seen as the bottom of the channel, a first side wall 9 and a second side wall 10, as well as a first lip 11 and a second lip 12, where the first 11 and the second lips 12 define the boundary of the opening 6. The channel 7 may be seen as having a height, which extends from the base 8 are towards the opening 6, a width that extends from the first side wall 9 to the second side wall 10, as well as a length, which is not shown in this sectional diagram, but may be described as being perpendicular to the plane of the cross sectional view.

The load carrying bar 1 further comprises a cover 13, having a channel sealing portion 14, that is configured to be positioned inside the opening 6 when the cover is in its raised position, i.e. its first position. The cover 13 further comprises a first biasing member 15 and a second biasing member 16, where the biasing members 15,16 are in contact with the base portion 8 of the channel 7, and provide a biasing force in an upwards direction to the channel sealing portion 14. Advantageously the biasing member 15, 16, may also be in contact with the side walls 9, 10 on their respective sides, in order to prevent the biasing members to spread when a force is applied downwards onto the channel sealing portion 14. The biasing members 15, 16 each may comprise a sealing portion 17, 18, that are adapted to be pushed upwards by the resilient force in the biasing members 15, 16, into contact with an inner surface 19, 20 of the lips 11, 12, to prevent water and dirt to enter the channel 7, when the cover is in its raised position. The side walls 21, 22 of the channel sealing portion 14 (seen in FIG. 2) may be tapered, where the horizontal distance from the bottom of the sides walls 21, 22 is greater than the horizontal distance of the top of the side walls 21, 22, which ensures that when the cover is transitioned from its second position to its first position, the narrower portion of the channel sealing portion 14 enters the opening first, in order to reduce the risk that the channel sealing portion 14 gets stuck in the opening 6 during the transition.

Figure 2:
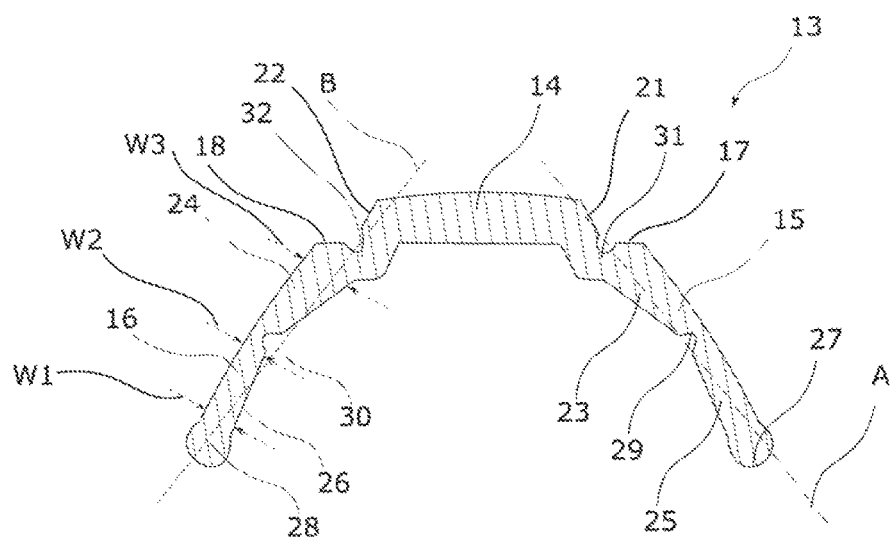
FIG. 2 is a cross sectional diagram of a cover, according to an embodiment.

FIG. 2 shows the cover 13 in more detail. The cover 13 may be seen as having a U or a V-like shape, where the channel sealing portion 14 is connected to a first biasing member 15 having a longitudinal axis A and a second biasing member 16 having a longitudinal axis B. The first 15 and the second 16 biasing members may be mirror images of each other, ensuring that the resilient force applied to the channel sealing portion 14 is identical from its first side 21 and its second side 22.

The biasing members may be provided with a first part 23, 24 and a second part 25, 26, where the first part is connected to the channel sealing portion 14 and the second part is a free end 27, 28. In an area between the first part 23, 24 and the second part 25, 26, the biasing member may be provided with a weakness 29, 30, which is adapted to facilitate and ease the bending of the biasing members 15, 16, when a force is applied to the channel sealing portion. Thus, when a downward force is applied to the cover, the weakness 29, 30 will be the area of the biasing member that is adapted to bend first, so that the bending or the flexing is focussed in this area of weakness. This allows the biasing members to bend in a completely predictable manner, where the first parts 23, 24 and the second parts 25, 26 substantially maintain their shape, while the biasing member flex in the area of weakness 29, 30. In this example, the area of weakness may be a groove, which extends along the length of the cover (perpendicular to the plane of the current view) Alternatively, the area of weakness may be an area were the width of the area is less than the first and or the second parts of the biasing member, ensuring that the area of weakness is the first area to flex when a force is applied to the cover.

The first 23, 24 and the second 25, 26 part of the biasing member may extend in a direction away from the longitudinal axis A, B in the central areas, where the first part 23, 24 is connected to the second part 25, 26, e.g. in the area of weakness, ensuring that when a force is applied to the biasing member 15, 16 in a direction parallel to the longitudinal axis A, B, the central area 29, 30 will deflect away from the longitudinal axis in a predefined direction. In this example, the central area 29, 30 is at a distance in an upwards and outwards direction from the longitudinal axis, which upon application of force will force the biasing members 15, 16 to flex so that the central area deflects away from the longitudinal axis in the same direction. The direction in this example may be substantially perpendicular to the longitudinal axis A, B. Thus, the area of weakness in this example may be positioned on the medial side (inner side) of the biasing members 15, 16.

The cover 13 may further be provided with a second area of weakness 31, 32, which is positioned in the area where the first end 23, 24 is connected to the first 21, and the second side 22 of the channel sealing portion 14. This second area of weakness 31, 32, may be positioned on an opposite side of the biasing members 15, 16, or on the lateral side of the biasing members, providing a further area where the cover 13 is intended to flex. The second area of weakness 31, 32 is positioned at a distance from the longitudinal axis A, B, in a direction that is downwards and inwards, so that the cover will flex in a direction that is opposite to the direction of the flexing in the first area of weakness 29, 30, so that when the biasing member flexes in the first area of weakness 29, 30, the first part 23, 24 will bend relative to the channel sealing portion 14. This flexing of the biasing members is shown in more detail in FIG. 3.

The free ends 27, 28 of the biasing members may be rounded, in order to facilitate the tilting of the biasing member relative to the base part 8 or the side walls 9, 10 of the channel 7.

As seen in FIG. 2 the first biasing member may have an area, where the width W1 of the second end 26 in an area that is distal to the central portion 30 of the biasing member may be greater than the width W2 of the biasing member in its central portion 30. This difference in width ensures that the central portion 30 has a significantly higher probability of buckling, and/or bending and/or flexing in the central area 30, ensuring that the biasing member 16 bends in a predefined area, when a vertical force is applied to the cover 13. In this example the weakness 30 in the form of a groove may be removed, where the buckling occurs in an area where the second end tapers towards the central portion. The first end 24 of the biasing member 16 may have a similar structure, where an area may be wider than another area, e.g. the central portion 30, to ensure that the buckling, flexing or bending occurs in that position. E.g. where a proximal part (closer to the channel sealing portion) is wider W3 than a distal part of the first end 24. The width W1-W3, may be seen as a distance that is transverse from the longitudinal axis B, or alternatively from the longitudinal axis C, D or E seen in FIG. 3.

Figure 3:
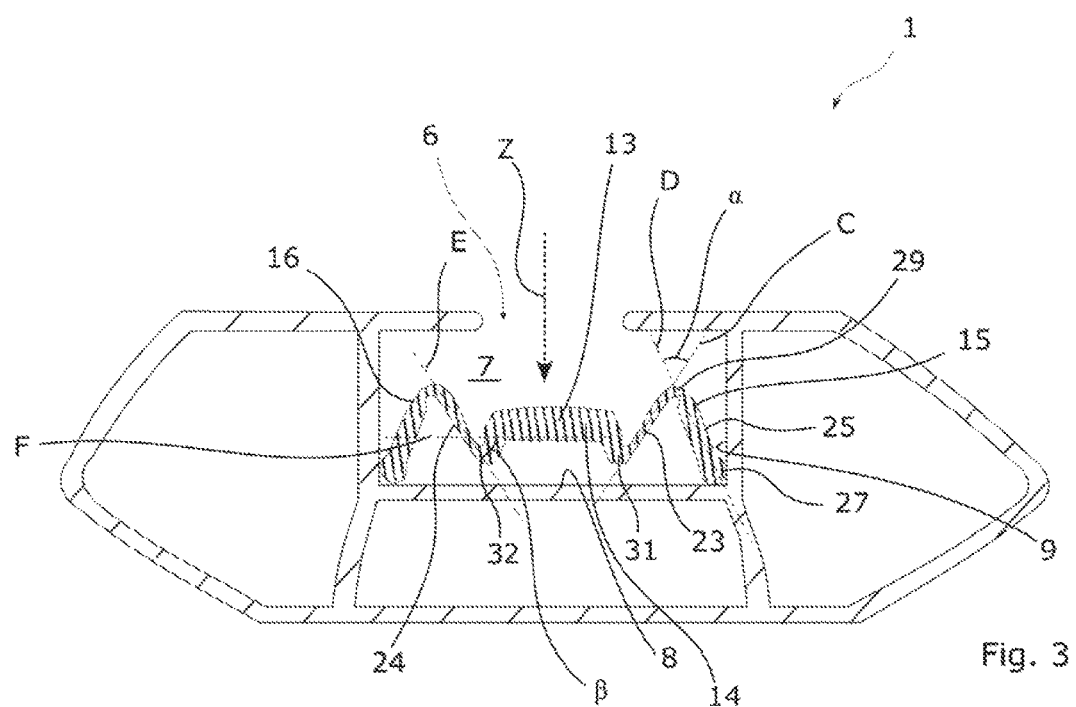
FIG. 3 is a cross sectional diagram of a load carrying bar having a cover in a second position according to an embodiment.

FIG. 3 shows a cover 13, in its second position, inside a channel 7 of a load carrying bar 1, where an external force Z has been applied to the top of the cover 13 in a vertical downwards direction onto the channel sealing portion 14. This has caused the channel sealing portion 14 to move in a direction away from the opening 6 towards the base 8 of the channel 7, which has caused the first 15 and the second 16 biasing member to flex in a predefined manner across the first 29 and the second 31 weakness. In this description, the description of the bending will be focussed on the first biasing member 15, but the disclosure may equally be applied to the opposite side, on the second biasing member 16, as this is substantially similar to the first biasing member 15.

When the force Z is applied to the channel sealing portion 14, the force is transferred via the connection between the biasing member 15 and the channel sealing portion, so that the force is transmitted towards the free end 27 of the biasing member 15. As the free end abuts the base 8 of the channel 7, and possibly also the side wall 9, the free end cannot be displaced in a downwards or radial outwards direction, and the force Z will build up in the biasing member 15. As the force is built up in the biasing member 15, the flexible and/or resilient material of the biasing member 15 will at some point begin to flex, and by positioning the first weakness 29 and the second weakness 31 in predefined positions, it is possible to ensure that the built up force will cause the flexing or bending of these predefined areas.

The flexing will occur in such a manner that a longitudinal axis C of the first part 23 and a longitudinal axis D of the second part 25 of the biasing member 15, will flex relative to each other, causing an angle α to reduce, from an angle when the cover is in its first position as shown in FIG. 1 and FIG. 2, causing the first part 23 to move closer to the second part 25 in a downwards direction. When this flexing occurs, in this embodiment, the second area of weakness 32 (for aesthetical purposes discussed in relation to the second biasing member 16) a longitudinal axis E of the first part 24 of the second biasing member 16, will flex and angle relative to a horizontal axis F of the channel sealing portion 14 at an angle β. The rotation of the angle of α is inverted to β, as the areas of weakness are on opposite sides of the biasing member. The second part 25 of the first biasing member may tilt or bias radially outwards, towards the side wall 9, having a pivoting point in its free end 27, in order to spread outwards to give room for the first part 23 and the channel sealing portion to extend in a downwards direction past the top of the second part, in order for the cover 13 to transform from a substantial U- or V-shape in a M-shape, as seen in FIG. 3.

The longitudinal Axis A, B, C, D and E, may define the length of the biasing member, where the transversal distance to the longitudinal axis may define the width, as shown in FIG. 2, while the length of the cover may be seen as an axis that extends along the length of the channel, which may be seen as perpendicular to the plane of the cross section seen in FIG. 1-FIG. 3.

What is claimed is:

1. A load carrying bar for a roof rack, said load carrying bar comprising a channel with an opening for receiving a fastening member of a load carrying bar accessory, and a cover comprising:
   a channel sealing portion adapted to substantially seal a cross section of the opening of said channel of said load carrying bar in a cross section; and
   at least one biasing portion configured in a first position to bias said channel sealing portion towards said opening and configured in a second position to deflect said channel sealing portion away from the opening, wherein the biasing portion comprises at least one biasing member, wherein a first end of the biasing member is connected to the channel sealing portion, a second end of the biasing member is configured to engage a base part of the channel, and a central portion is positioned between the first end and the second end, wherein the central portion of the biasing member has a length between the first and the second end and a width that is substantially transversal to the length of the biasing member,
   wherein the at least one biasing member has a first width in the vicinity of the first or the second end and a second width at the central portion, wherein the first width is greater than the second width such that the at least one biasing member flexes in the central portion when transitioned from the first position towards the second position, or wherein the at least one biasing member has a first area of weakness positioned on a medial side of the at least one biasing member and a second area of weakness positioned on a lateral side of the biasing member allowing the biasing member to flex in the first and second area of weakness when transitioned from the first position towards the second position.

2. The load carrying bar according to claim 1, wherein the cover comprises a second biasing member, wherein a first end of the second biasing member is connected to the channel sealing portion, a second end of the biasing member is configured to engage a base part of the channel, and a central portion is positioned between the first end and the second end, and configured correspondingly to the first biasing member.

3. The load carrying bar according to claim 2, wherein the cover has a cross section that is substantially U-shaped or V-shaped.

4. The load carrying bar according to claim 2, wherein the first ends of the first and second biasing members are connected on opposing sides of the sealing portion.

5. The load carrying bar according to claim 2, wherein a distance between the first ends of the first and second biasing members is shorter than a distance between the second ends of the first and second biasing members.

6. The load carrying bar according to claim 2, wherein the cover in the second position has a substantial M-shape or wherein the channel sealing portion is pushed vertically away from the opening, and wherein the first and the second biasing members create a V-shape that is mirrored across a horizontal axis.

7. The load carrying bar according to claim 1, wherein a width of the sealing portion is smaller than a width of the opening of the channel.

8. The load carrying bar according to claim 1, wherein a contact surface of the second end of the at least one biasing member is rounded.

9. The load carrying bar according to claim 1, wherein the first end of the biasing member comprises a contact surface to abut an inner wall of the channel, wherein the inner wall of the channel is a substantially horizontal wall, an upper wall of the channel, or positioned in an area between the opening and a side wall of the channel.

10. The load carrying bar according to claim 1, wherein the at least one biasing member has a first portion having a first central axis and a second portion having a second central axis, wherein the first and the second central axes are at an angle to each other, not coaxial, or not parallel to each other.

11. The load carrying bar according to claim 1, wherein the central portion or the first and second area of weakness extends along a length of the cover parallel to a length of the load carrying bar or a length of the channel.

12. The load carrying bar according to claim 1, wherein the central portion or the first and second area of weakness is configured to reduce an angle or have a sharper angle between the parts of the cover that abut the central portion or the first and second area of weakness, when transitioning from the first position to the second position.

13. The load carrying bar according to claim 1, wherein the central portion or the first and second area of weakness comprises a fold line that extends a length of the cover or is parallel to the channel or the load carrying bar.

14. The load carrying bar according to claim 1, wherein the first and second ends taper towards the central portion.

15. The load carrying bar according to claim 1, wherein the at least one biasing member has a first width in the vicinity of the first and the second end and a second width at the central portion, wherein the first width is greater than the second width such that the at least one biasing member flexes in the central portion when transitioned from the first position towards the second position.

16. The load carrying bar according to claim 1, wherein the at least one biasing member has a first width in the vicinity of the first or the second end and a second width at the central portion, wherein the first width is greater than the second width such that the at least one biasing member flexes in the central portion when transitioned from the first position towards the second position, and wherein the at least one biasing member has a first area of weakness positioned on a medial side of the at least one biasing member and a second area of weakness positioned on a lateral side of the biasing member allowing the biasing member to flex in the first and second area of weakness when transitioned from the first position towards the second position.

17. The load carrying bar according to claim 16, wherein the at least one biasing member has a first width in the vicinity of the first and the second end and a second width at the central portion, wherein the first width is greater than the second width such that the at least one biasing member flexes in the central portion when transitioned from the first position towards the second position.

* * * * *